United States Patent [19]

Early

[11] Patent Number: 5,517,925
[45] Date of Patent: May 21, 1996

[54] RAILROAD CAR HATCH COVER SYSTEM

[75] Inventor: Stephen R. Early, Olathe, Kans.

[73] Assignee: Aero Transportation Products, Inc., Independence, Mo.

[21] Appl. No.: 456,550

[22] Filed: Jun. 1, 1995

[51] Int. Cl.⁶ .................................................. B61D 39/00
[52] U.S. Cl. .............................. 105/377.07; 105/377.08; 105/377.11; 220/254; 220/314
[58] Field of Search ......................... 105/377.05, 377.07, 105/377.08, 377.11; 114/201 R; 296/100, 101; 220/254, 314, 315

[56] References Cited

U.S. PATENT DOCUMENTS

| | | | |
|---|---|---|---|
| 3,631,816 | 1/1972 | Miller | 105/377.05 |
| 3,934,518 | 1/1976 | Adler | 105/377.11 |
| 4,040,363 | 8/1977 | Walk et al. | 105/377.11 |
| 4,126,094 | 11/1978 | Zimmerle et al. | 105/377.11 |
| 4,307,670 | 12/1981 | Nadherny | 105/377.08 |
| 4,690,070 | 9/1987 | Miller | 105/377.11 |
| 4,889,056 | 12/1989 | Stewert | 105/377.11 |

Primary Examiner—Matthew C. Graham
Assistant Examiner—S. Joseph Morano
Attorney, Agent, or Firm—Chase & Yakimo

[57] ABSTRACT

A hatch cover system for a railroad car employs a longitudinally extending series of end-to-end main hatch covers wherein each adjacent pair of covers has proximate, concave ends defining a circular port that permits access to the interior of the car when the covers are in their closed positions. A relatively small, circular cover is provided for each port and, in its closed and locked position over the associated port, also serves as a batten to hold the adjacent main covers closed. For operations not requiring that the entire hatch be open, the ports provide easy access to the interior of the car without the need to raise the heavy main covers and swing them to their open positions. The number of hinges required by the cover system is significantly reduced by the use of a special hinge device adjacent each port that serves as a mount for the associated port cover and both of the adjacent main covers.

12 Claims, 2 Drawing Sheets

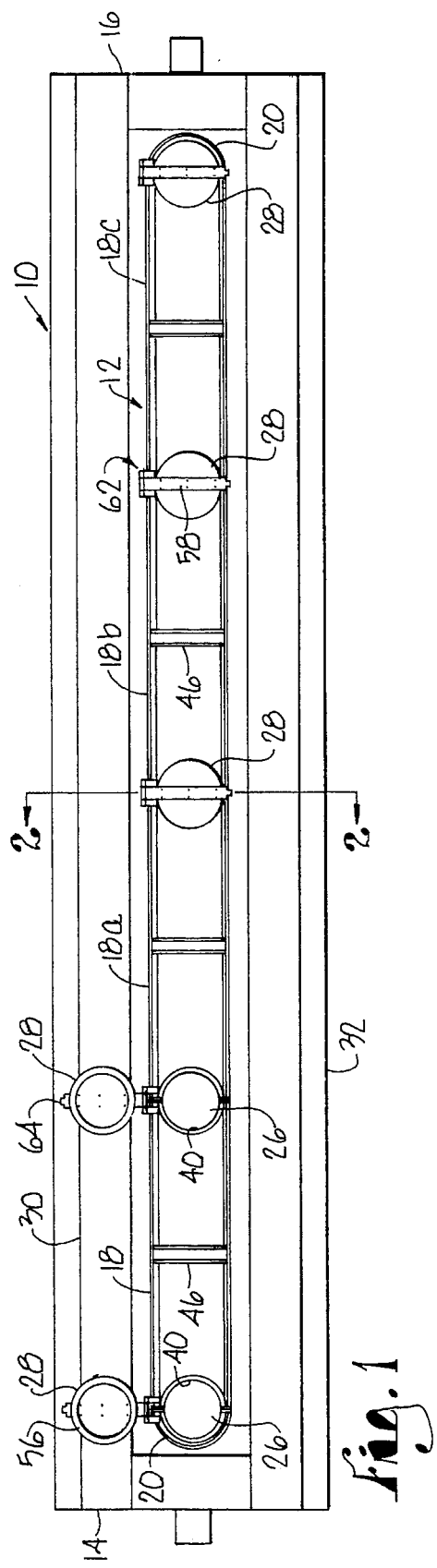
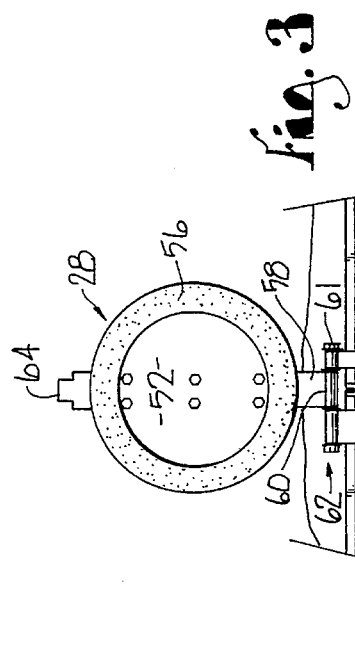
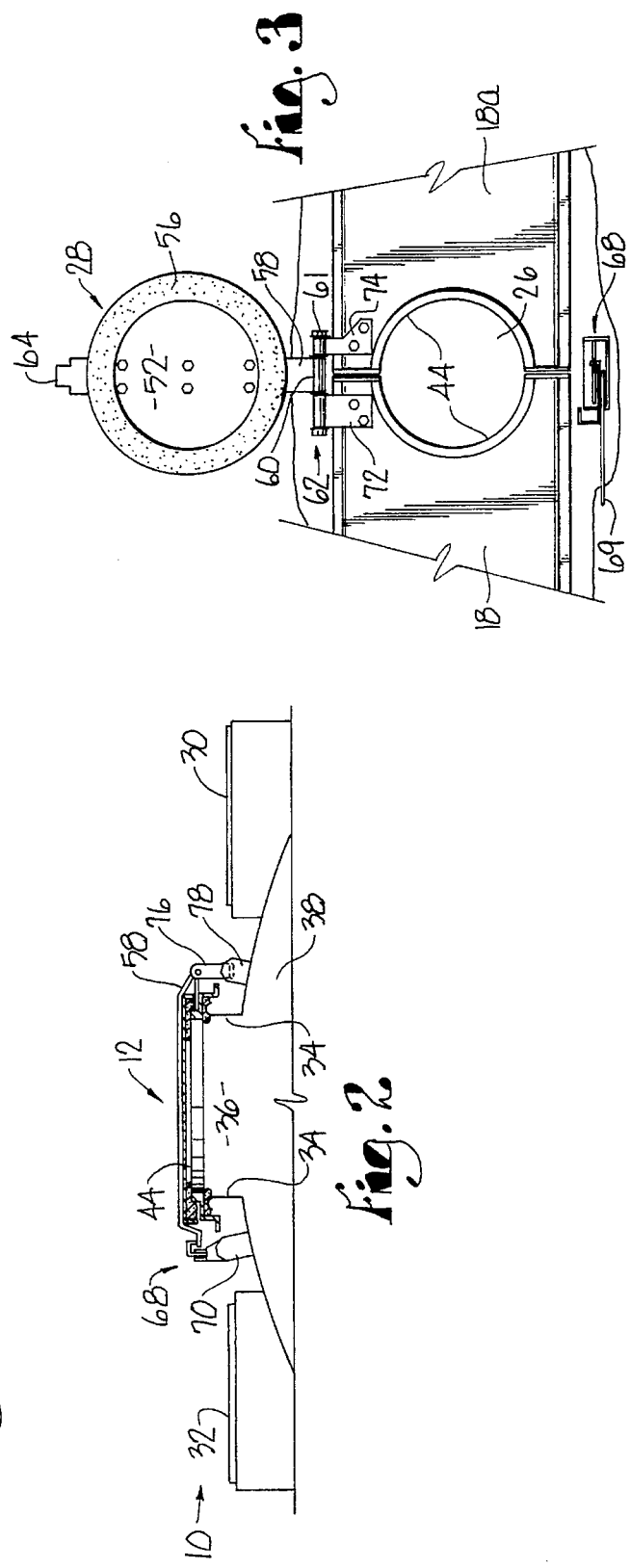

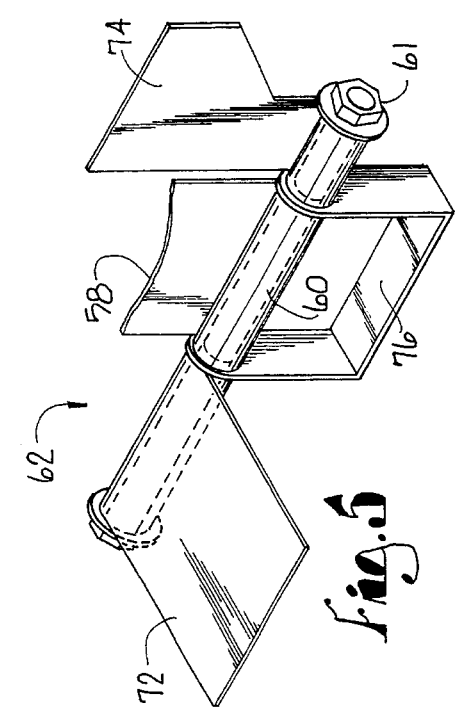
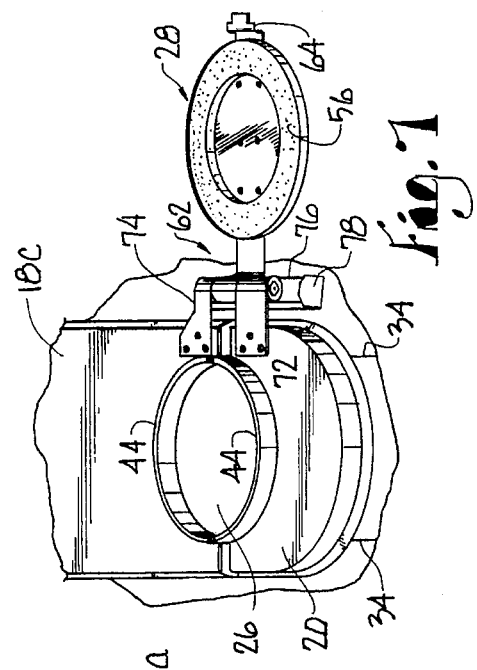
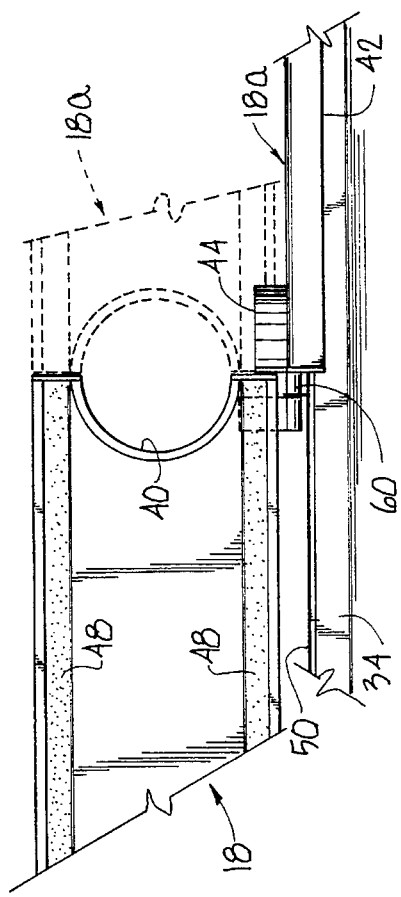
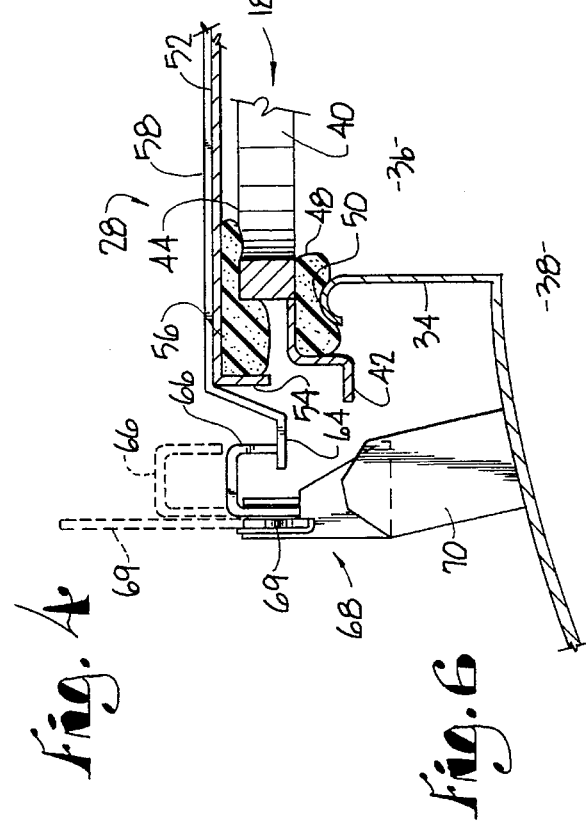

RAILROAD CAR HATCH COVER SYSTEM

BACKGROUND OF THE INVENTION

This invention relates to improvements in hatch cover systems for railroad cars and, in particular, to a cover system that provides access ports at the ends of the main hatch covers which may be independently opened and closed by port covers which also serve as battens, and that significantly reduces the number of hinges and other hardware required to mount the hatch covers and associated components.

Railway hopper cars have been employed for years to transport particulate and granular materials such as grain. Typically, a car is loaded or unloaded through the use of overhead chutes that extend through one or more hatches in the top of the car that have been opened for loading or unloading purposes. One type of hopper car in widespread use presents a continuous trough extending substantially the length of the car which communicates with the top of the car and is closed during transport by a series of longitudinally extending, end-to-end hatch covers. One means of securing the hatch covers during transport is to employ battens located at the abutting ends of the covers that are locked in place to hold the covers closed.

In a railroad car of the type just described, the battens are independently mounted on hinges and must be released and pivoted away from the hatch covers before the covers can then be swung to open positions. It may be appreciated, therefore, that the opening of one hatch cover to gain access to the trough requires the release of two battens and then the manual lifting of the cover to its open position. The cover may be of from eight to thirteen feet in length and weigh on the order of 100 pounds. Furthermore, this arrangement requires the use of a number of separate hinges and hardware to mount each cover and the associated battens.

In summary, the hatch arrangement described above does not provide a means to gain access to the trough without manually raising large, heavy hatch covers. The battens and their hinges are independent parts that add to the complexity of the arrangement. Separate hinges for the covers and the battens add to the number of components required and increase the cost as well as the time required to initially install the hatch covers and then maintain the covers and associated components over the life of the hopper car.

SUMMARY OF THE INVENTION

It is, therefore, the primary object of the present invention to provide a hatch cover system for a railroad car having the advantage of versatility and which presents options in the manner in which it may be used.

As a corollary to the foregoing object, it is an important aim of this invention to provide a cover system as aforesaid that has access ports in addition to the main hatch covers which may be opened while the hatch covers remain closed, covers for the ports being relatively small and lightweight and thus easily manipulated by hand.

Another important object of this invention is to provide a cover system with access ports as aforesaid where the ports are formed at the ends of the main hatch covers, each port being opened or closed by a secondary cover which is movable entirely independently of the main hatch covers.

Another important object is to provide such a system in which each of the longitudinally extending main covers has a pair of opposed, concave ends, wherein the abutting ends of adjacent covers cooperate to provide the access ports.

Still another important object of the invention is to provide such a cover system in which the covers for the ports, when closed, also serve as battens by engaging the proximate ends of the main covers to hold them closed.

Yet another important object is to provide covers for the ports that, when closed and locked in place, seal both the ports and the associated ends of the main covers.

Additionally, it is an important object of the present invention to provide a common mounting device adjacent the proximate ends of a pair of longitudinally extending,, end-to-end hatch covers, wherein the device pivotally mounts the two adjacent covers and a batten without the need for additional, independent hinges.

In furtherance of the foregoing object, it is an important aim of this invention to provide such a common mounting device having independent rotary elements rotatable about a single hinge axis and joined to respective components, e.g., hatch covers and batten or hatch covers and a port cover/ batten, to provide for movement of these components between their closed and open positions.

Other objects will become apparent as the detailed description proceeds.

DESCRIPTION OF THE DRAWINGS

FIG. 1 is a plan view of a railroad car equipped with the hatch cover system of the present invention.

FIG. 2 is an enlarged, fragmentary, cross-sectional view taken along line 2—2 of FIG. 1.

FIG. 3 is an enlarged, fragmentary, plan view showing the second, open port from the left seen in FIG. 1.

FIG. 4 is an enlarged, fragmentary, front elevational view of the railcar of FIG. 1 looking at one of the intermediate ports, the hatch cover on the left being shown in full lines in a raised condition and the hatch cover on the right being shown in broken lines in a like condition.

FIG. 5 is a detail showing the common hinge device in perspective removed from the railroad car.

FIG. 6 is a greatly enlarged view of a portion of the cross-sectional view of FIG. 2, the lock being shown released in broken lines.

FIG. 7 is a fragmentary, perspective view of an open end port.

DETAILED DESCRIPTION

Referring initially to FIGS. 1–4, a railroad car 10 is provided with the hatch cover system 12 of the present invention which extends longitudinally along the top of the car 10 essentially from the left end 14 to the right end 16 of the car. The cover system 12 illustrated herein has four longitudinally extending, end-to-end main or primary covers 18, 18a, 18b and 18c from left to right as viewed in FIG. 1. Additionally, five longitudinally spaced, circular access ports 26 of identical construction are provided by the cover system 12 and are located at the left and right ends thereof (as viewed in FIG. 1) and at intermediate positions between main covers 18 and 18a, 18a and 18b, and 18b and 18c. A secondary cover 28 of generally circular configuration is associated with each of the ports 26, the two covers 28 for the first and second ports 26 being shown in their open positions in FIG. 1 overlying the top of a running board 30 that extends the length of the car 10. The remaining ports in FIG. 1 are closed by their port covers 28 and thus are hidden from view. As may be appreciated by a comparison of FIGS. 1 and 2, a second running board 32 on the opposite side of the cover system 12 extends in parallelism with running board 30. As is conventional, running boards 30 and 32 are provided for attending personnel during loading and unloading of the car 10 when it is necessary to operate the cover system 12 of the present invention.

As may be appreciated by a comparison of FIGS. 2, 4 and 6, the car 10 is provided with two parallel, longitudinally extending walls 34 spaced equidistant from the transverse center of the car which provide a coaming along the top of the car 10 on which the cover system 12 is disposed. The coaming 34 presents a hatch that defines a longitudinal opening or trough 36 which communicates with the storage compartment 38 of the car therebelow, partially revealed in FIGS. 2 and 6.

The four main hatch covers 18, 18a, 18b and 18c are all shown in their closed positions in FIG. 1 over opening 36, cover 18 being fully visible as the ports 26 at each end thereof are open. Accordingly, it may be seen that cover 18 has a pair of opposed, concave ends 40 of semicircular configuration, each of which forms a half port. All of the main covers 18, 18a, 18b and 18c are of identical construction and are of rectangular configuration except for the half-port ends 40. A pair of small, semicircular cover segments 20 cooperate with the respective outer ends 40 of end covers 18 and 18c to complete the end ports 26.

As shown herein, each main cover is composed of a flat sheet of aluminum with downturned longitudinal margins 42, each of the concave ends 40 being presented by a semicircular rim 44 welded to the aluminum sheet and projecting from the plane thereof, or upwardly as viewed in FIG. 6 where cover 18a is shown in its closed position. As used herein, the term "concave" applies to cover end configurations in addition to the semicircular shape illustrated, as the ports 26 could also be noncircular or polygonal. A cross member 46 for reinforcing the aluminum sheet is provided for each of the covers 18, 18a, 18b and 18c.

Referring to FIGS. 2, 4 and 6, it may be seen that each of the main covers 18–18c has a pair of longitudinally extending gasket strips 48 located at its longitudinal margins for the purpose of contacting the upper edges of the sidewalls (coaming) 34 which are bent over to present a smooth arcuate surface 50. Accordingly, the hatch is effectively sealed by the main covers when they are closed and secured in a manner to be discussed.

Each of the port covers 28 is of identical construction and comprises a circular sheet 52 (which may be of aluminum) having a circumferential lip 54 within which an annular gasket 56 is seated and positioned for sealing contact with opposed rims 44 (FIG. 6) when the associated port 26 is closed. A mounting and locking bar 58 extends diagonally across sheet 52 and is secured thereto by suitable fasteners, one end of the bar 58 being formed into a hinge barrel 60 (FIG. 5) that receives a pin 61 of a hinge device 62. The opposite end of the bar 58 presents a lug 64 which is engageable by a latch dog 66 of a conventional cover lock 68 (FIG. 6). A bracket 70 projects from the top of the car 10 and supports the lock 68 at a position adjacent port 26 to receive lug 64. It should be understood that, although not shown in FIG. 1 due to the scale of the drawing, five locks 68 are employed in the cover system 12 adjacent respective ports 26 for the purpose of maintaining the covers 28 thereof secure in their closed positions.

The hinge device 62 shown in detail in FIG. 5 comprises a common mount for all of the moveable components of the cover system 12 at a location on the cover system where one of the ports 26 is present. The arrangement for the second port 26 from the left is shown in FIG. 3 and is representative. The hinge pin 61 defines a longitudinally extending axis and carries three axially spaced, independent rotary elements, the center element being the hinge barrel 60 on bar 58 of cover 28 previously described. A second element or leaf 72 is secured by fasteners to main cover 18 at the adjacent corner thereof. The third element or leaf 74 is fastened to the proximate corner of main cover 18a. The hinge leaves 72 and 74 may be at either end of pin 61 as desired (compare FIGS. 3 and 7). Although covers 18, 18a and 28 are thus independently rotatable about the axis of hinge pin 61 between open and closed positions, it may be appreciated from FIGS. 2 and 6 that the primary covers 18 and 18a are held closed by the port cover 28 when it is closed and secured by lock 68. Accordingly, each of the port covers 28 in cover system 12 also serves as a batten to secure the entire cover system when all of the ports 26 are closed and their covers 28 locked.

As the hinge device 62 comprising the single hinge pin 61 and associated rotary elements is the sole mounting hinge for the cover components of the system 12 at each of the ports 26, it may be appreciated that each main cover 18, 18a, 18b or 18c requires only two hinge devices 62, one at each end shared with an adjacent main cover or cover segment 20, to mount the cover for swinging movement between its open and closed positions. The pin 61 of each device 62 is supported at the proper height by upstanding legs of a U-shaped bracket 76 that is welded to an underlying U-shaped bracket 78, the base of which is welded to the top of the car 10.

In utilizing the cover system 12 of the present invention, the first step in opening the hatch to expose the trough 36 is to release the locks 68 and swing two or more adjacent port covers 28 to their open positions resting on running board 30. This fully open position is shown in FIG. 1 (first two covers 28 from the left) and in FIGS. 3 and 7. As illustrated in FIG. 6, each lock 68 is released by raising its operating handle 69 to the broken line position to raise the latch dog 66 and disengage lug 64. Since each of the port covers 28 is relatively small, e.g., approximately two feet in diameter, and constructed of a light-weight material such as aluminum, an operator may easily lift it with one hand and swing it open.

As the port covers 28 also serve as battens, it may be appreciated that opening the ports 26 releases the main covers 18, 18a, 18b and 18c so that they may then be swung to open positions resting on the running board 30. In FIG. 4, main cover 18 is shown in full lines raised from its closed position as it is being swung open; main cover 18a is also shown raised in broken lines. In applications where access to the entire trough 36 is desired for loading or unloading the car 10, all of the main covers would be swung to their open positions. In the cover system 12 illustrated herein where four main covers are employed, this is accomplished using only five hinge devices 62 located adjacent respective ports 26.

To close the hatch, the process is, of course, reversed as the main covers are closed first followed by the port covers 28. Operation of the five locks 68 secures the covers 28 (FIG. 6) and thus also holds the main covers closed by the sealing engagement of each of the annular gaskets 56 with the underlying rims 44 at the concave cover ends 40.

When it is necessary to inspect the compartment 38, insert a probe for a grain sample or conduct other operations not requiring that one or more of the main covers be raised, a selected port 26 may be opened by simply releasing the cover 28 and swinging it to the open position illustrated. As may be appreciated from FIGS. 1 and 3, the two main covers adjacent an open port 26 (such as 18 and 18a in FIG. 3) remain in their fully closed positions over the coaming 34 with gasket strips 48 in sealing engagement with the curved lip 50 of the coaming. The same is true when the ports 26 are opened at the ends of the cover system 12 as illustrated in FIG. 7 (cover 18c and segment 20 closed). Therefore, in applications where loading and unloading of materials may be accomplished through the small ports 26, all of the main hatch covers remain closed. The availability of the smaller ports 26 for loading and unloading of fine particulate material is a particularly beneficial option in those applications where it is important to control the generation of dust.

Having thus described the invention, what is claimed as new and desired to be secured by Letters Patent is as follows:

1. A cover system for a railroad car having a hatch defining a longitudinally extending opening therein, said system comprising:

a longitudinally extending primary cover having a pair of opposed, concave ends, means for mounting said primary cover for movement between a closed position with respect to said opening and an open position permitting access to the car through the hatch, a pair of cover elements adjacent respective ends of said primary cover, each cooperating with the proximate concave end to provide a port permitting access to the hatch when the primary cover is in its closed position, a pair of secondary covers adjacent respective ends of said primary cover, means for mounting each of said secondary covers for movement between a position closing a corresponding port and overlying the proximate end of the primary cover and the adjacent cover element, and an open position with respect to the corresponding port, and means for selectively securing each of said secondary covers in said position closing the associated port, whereby to also hold the primary cover in its closed position.

2. The cover system as claimed in claim 1, wherein each of said cover elements has a concave edge portion cooperating with the proximate concave end to present the corresponding port.

3. The cover system as claimed in claim 2, wherein each of said ports has a generally circular configuration.

4. A cover system for a railroad car having a hatch defining a longitudinally extending opening therein, said system comprising:

a plurality of longitudinally extending, end-to-end primary covers, each adjacent pair of said primary covers having proximate, concave ends, means for mounting each of said primary covers for movement between a closed position with respect to said opening and an open position permitting access to the car through the hatch, each pair of proximate ends of said primary covers cooperating to provide a port permitting access to the hatch when the associated primary covers are in their closed positions, a secondary cover for each port, and means for mounting each secondary cover for movement between a position closing the associated port and overlying the proximate ends of the adjacent primary covers, and an open position with respect to the associated port, and means for selectively securing each secondary cover in said position closing the associated port, whereby to also hold the adjacent primary covers in their closed positions.

5. The cover system as claimed in claim 4, wherein each of said concave ends is provided with an outwardly projecting rim defining approximately one-half of the associated port.

6. The cover system as claimed in claim 5, wherein each secondary cover has means engageable with the rims defining the associated port for sealing the port upon closure thereof.

7. The cover system as claimed in claim 4, wherein each of said concave ends is provided with an outwardly projecting, generally semicircular rim defining approximately one-half of the associated port.

8. The cover system as claimed in claim 4, wherein each secondary cover has means for sealing the associated port upon closure thereof.

9. The cover system as claimed in claim 4, wherein said mounting means for said primary and secondary covers includes a common hinge device adjacent each port, each device defining a longitudinally extending axis and having independent rotary elements rotatable about said axis and joined to respective covers to provide independent swinging movement of each cover between its closed and open positions.

10. A cover system for a railroad car having a hatch defining a longitudinally extending opening therein, said system comprising:

a pair of longitudinally extending, end-to-end covers having proximate ends, means for mounting each of said covers for swinging movement between a closed position with respect to said opening and an open position permitting access to the car through the hatch, a batten member for securing said covers in their closed positions, and said mounting means including a common hinge device for said covers and said member adjacent said proximate ends, said device defining a longitudinally extending axis and having independent rotary elements rotatable about said axis and joined to respective covers and said member to provide said movement of said covers between their closed and open positions and mount said member for swinging movement to and from a position engaging the covers when they are closed.

11. The cover system as claimed in claim 10, wherein said device includes a hinge pin defining said axis and means for supporting said pin on said car adjacent said proximate ends, said elements being axially spaced on said pin.

12. The cover system as claimed in claim 10, wherein said proximate ends are concave and cooperate with each other to provide a port permitting access to the hatch when the covers are in their closed positions, said batten member including means for closing said port when the member is in its cover-engaging position.

\* \* \* \* \*